US010439804B2

(12) United States Patent
Zhang et al.

(10) Patent No.: US 10,439,804 B2
(45) Date of Patent: Oct. 8, 2019

(54) DATA ENCRYPTING SYSTEM WITH ENCRYPTION SERVICE MODULE AND SUPPORTING INFRASTRUCTURE FOR TRANSPARENTLY PROVIDING ENCRYPTION SERVICES TO ENCRYPTION SERVICE CONSUMER PROCESSES ACROSS ENCRYPTION SERVICE STATE CHANGES

(71) Applicant: EMC IP Holding Company LLC, Hopkinton, MA (US)

(72) Inventors: Ping Zhang, Shrewsbury, MA (US); Charlie Kaufman, Redmond, WA (US); Gregory W. Lazar, Upton, MA (US); Yi Fang, Sharon, MA (US); Xuan Tang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 15/795,482

(22) Filed: Oct. 27, 2017

(65) Prior Publication Data

US 2019/0132120 A1 May 2, 2019

(51) Int. Cl.
*H04L 9/08* (2006.01)
*H04L 9/06* (2006.01)
*H04L 29/06* (2006.01)

(52) U.S. Cl.
CPC ............ *H04L 9/0822* (2013.01); *H04L 9/065* (2013.01); *H04L 9/0618* (2013.01); *H04L 63/0457* (2013.01)

(58) Field of Classification Search
CPC ............................. H04L 9/065; H04L 9/0618
See application file for complete search history.

(56) References Cited

U.S. PATENT DOCUMENTS 9,104,882 B2 * 8/2015 Salinger .................. G06F 21/10
9,270,461 B2 * 2/2016 Giladi ............... H04N 21/26258
(Continued)

OTHER PUBLICATIONS

"Announcing the Advanced Encryption Standard (AES)", Federal Information Processing Standards Publication 197, Nov. 26, 2001, 47 pages.
(Continued)

*Primary Examiner* — Ali Shayanfar
(74) *Attorney, Agent, or Firm* — BainwoodHuang

(57) ABSTRACT

In response to determining that an encryption operation request includes no indication of a cryptographic key, an encryption service module performs an encryption operation using a current cryptographic key retrieved by the encryption service module, and creates and stores an encrypted data object that includes the resulting ciphertext and a key identifier that uniquely identifies the cryptographic key and the associated cryptographic algorithm used to perform the encryption. A subsequent decryption operation request to the encryption service module that indicates the encrypted data object is processed by retrieving the cryptographic key and identifying the associated cryptographic using the key identifier contained in the encrypted data object. The encrypted data object may also include an initialization vector used to generate the ciphertext contained in the encrypted data object, as well as an integrity check value generated across the ciphertext and initialization vector.

15 Claims, 8 Drawing Sheets

(56) References Cited

U.S. PATENT DOCUMENTS

| | | | | |
|---|---|---|---|---|
| 9,667,422 | B1* | 5/2017 | Androulaki | G06F 12/1408 |
| 9,887,975 | B1* | 2/2018 | Gifford | H04W 12/10 |
| 9,990,249 | B2* | 6/2018 | Durham | G06F 11/1004 |
| 9,992,170 | B2* | 6/2018 | O'Hare | G06F 21/606 |
| 2008/0279367 | A1* | 11/2008 | Thaker | G09C 1/00 |
| | | | | 380/28 |
| 2009/0210696 | A1* | 8/2009 | Moreau | H04L 63/0435 |
| | | | | 713/151 |
| 2013/0198525 | A1* | 8/2013 | Spies | G06F 21/6227 |
| | | | | 713/189 |
| 2014/0331062 | A1* | 11/2014 | Tewari | G06F 21/6227 |
| | | | | 713/189 |
| 2016/0315956 | A1* | 10/2016 | Giladi | H04L 63/1416 |
| 2017/0346624 | A1* | 11/2017 | Choi | H04L 9/003 |
| 2018/0054303 | A1* | 2/2018 | O'Toole | H04L 9/0822 |
| 2018/0189502 | A1* | 7/2018 | Kumar | G06F 21/602 |
| 2018/0191492 | A1* | 7/2018 | Barham | H04L 9/0637 |
| 2018/0212781 | A1* | 7/2018 | Keser | H04L 9/3247 |
| 2018/0260430 | A1* | 9/2018 | Tschudin | G06F 21/6254 |

OTHER PUBLICATIONS

"Secure Hash Standards (SHS)", Federal Information Processing Standards Publication, FIPS PUB 180-4, Information Technology Laboratory, National Institute of Standards and Technology, Gaithersburg, MD, issued Aug. 2015, 36 pages.

"RSA Introduces BSAFE SSL-C for Worldwide Markets", RSA Data Security, Jan. 6, 1999, 5 pages, accessed on Dec. 6, 2017.

"Security Requirements for Cryptographic Modules", Federal Information Processing Standards Publication, FIPS PUB 140-2, Information Technology Laboratory, National Institute of Standards and Technology, Gaithersburg, MD, issued May 25, 2001, 61 pages.

* cited by examiner

DECRYPTION OPERATION REQUEST PARAMETERS 400

| DECRYPTION KEY IDENTIFIER (OPTIONAL) 402 | LOCATION OF CIPHERTEXT BUFFER 404 | LOCATION OF PLAINTEXT OUTPUT BUFFER 406 | CIPHERTEXT BUFFER LENGTH 408 | PLAINTEXT OUTPUT BUFFER LENGTH 410 | ENCRYPTION POLICY NAME (OPTIONAL) 412 |
|---|---|---|---|---|---|

Fig. 4

DATA ENCRYPTING SYSTEM WITH ENCRYPTION SERVICE MODULE AND SUPPORTING INFRASTRUCTURE FOR TRANSPARENTLY PROVIDING ENCRYPTION SERVICES TO ENCRYPTION SERVICE CONSUMER PROCESSES ACROSS ENCRYPTION SERVICE STATE CHANGES

TECHNICAL FIELD

The present disclosure relates generally to data encrypting systems, and more specifically to technology for transparently providing encryption services to encryption service consumer processes executing in one or more data encrypting system, across encryption service state changes such as cryptographic key rollovers.

BACKGROUND

Data encrypting systems are arrangements of hardware and software that perform encryption and decryption operations using cryptographic keys. During an encryption operation, data referred to as "plaintext" is encrypted using a cryptographic algorithm (also known as a "cipher") embodied in program logic and/or hardware logic to generate "ciphertext" that can only be accessed if it is properly decrypted through a corresponding decryption operation. Data encryption and decryption operations typically use pseudo-random cryptographic keys as parameters that determine their output. In a data encryption operation, the key used specifies how plaintext is transformed into ciphertext. The reverse is true during a decryption operation; the key used specifies how previously encrypted ciphertext is transformed back into plaintext. Cryptographic keys are also used to specify transformations in other cryptographic operations, such as the generation of digital signatures and/or authentication codes.

In symmetric-key cryptography, the same cryptographic key is used for both encryption and decryption. Accordingly, in a symmetric-key system the encrypting entity and the decrypting entity must both have possession of the same key.

In asymmetric cryptography, also known as "public-key" cryptography, each individual entity is assigned a unique key pair that includes a public key and a private key. Plaintext that is encrypted using a given private key can only be decrypted using the public key from the key pair to which the private key belongs, and plaintext that is encrypted using a given public key can only be decrypted using the private key to which the public key belongs. The public key of a key pair may be disseminated widely, but the private key must be maintained in secret by the entity to which the key pair is assigned. Recipients of the public key can use it to encrypt plaintext, and the resulting ciphertext can only be decrypted by the entity to which the key pair was assigned, using the private key of the key pair. The entity to which a key pair is assigned can also use the private key of the key pair to generate digital signatures for messages that can be used by holders of the public key of the key pair to ensure that the contents of each message have not been modified since the digital signature was generated by the entity to which the key pair was assigned.

The lifecycle of a cryptographic key begins when the key is generated, which is typically accomplished using a cryptographically secure random bit generator. The newly generated key, along with a number of associated attributes, is then stored into at least one key storage database referred to as a "key store". The key and the rest of the contents of the key store may be encrypted using what is referred to as a "master" key. Attributes corresponding to and stored with individual keys may include key name, activation date, and key length. Different key lengths provide different key strengths, with longer keys generally providing better protection against attacks. Different cryptographic algorithms may use different lengths of keys. A key may be activated when it is initially generated or activated automatically or manually at a later time.

Once a key is activated, it may be changed as a result of certain events occurring. In a process referred to as "key rollover", a previously established time schedule determines when an individual key is to be replaced, according to a specific expiration date or crypto-period associated with the key. In another example, a key may be caused to be replaced if it is suspected of being compromised. In another example, an encryption policy may be changed in a way that causes a key related to the policy to be replaced, e.g. in the case where a new or updated security policy requires that a longer and therefore higher strength key by used when performing subsequent encryption operations covered under the policy.

SUMMARY

Unfortunately, previous data encrypting systems have exhibited significant shortcomings with regard to the impact that changes to keys and/or encryption algorithms have had on the processes that use the encryption services that are included in and/or used by the data encrypting systems. For example, some previous data encrypting systems have included and/or used encryption services that require a process that requests an encryption operation to expressly provide or indicate the specific key and/or the specific cryptographic algorithm that is to be used for the operation, at the time the request is made. For example, some previous encryption services have required a process that requests an encryption operation to provide, as part of the request, the specific key to be used during the encryption operation. Similarly, some previous encryption services have required a process that requests a decryption operation to provide, as part of the request, the key to be used during the decryption operation. In addition, some previous data encrypting systems have included and/or used encryption services that require a process that requests an encryption or decryption operation to expressly specify in the request the encryption algorithm that is to be used during the operation. In such previous systems, whenever key changes occur resulting from key rollovers, keys being compromised, and/or security policy changes, all processes that invoke encryption operations provided by the encryption service have had to be modified to expressly indicate the new key in the requests they issue to the encryption service for encryption operations. Similarly, in the case where an encryption algorithm used by the encryption service was changed, e.g. when a policy was updated to require that a stronger encryption algorithm be used by certain processes, those processes operations had to be modified to expressly indicate the new encryption algorithm in their encryption operation requests. In systems in which large numbers of different processes make requests for encryption operations, making such modifications to those processes so that the new key and/or encryption algorithm can be used may be so time consuming and resource intensive that they are practically infeasible. As a result, poor and insufficient data security may be provided due to the inability of the processes executing in such previous systems to utilize newly updated versions of keys and/or encryption algorithms that may be required, and that are available and used by the encryption service.

In order to address the above described and other shortcomings of previous technologies, new technology is disclosed herein for providing encryption services in a data encrypting system. In the disclosed technology, an encryption operation request may be received from an encrypting consumer process executing on processing circuitry contained in the data encrypting system, by an encryption service module also executing on the processing circuitry. The encryption operation request includes a set of encryption parameters. The set of encryption parameters may include a location of a plaintext buffer in a memory of the data encrypting system and a location of a ciphertext output buffer in the memory of the data encrypting system for storing ciphertext resulting from encrypting the contents of the plaintext buffer. The disclosed encryption service module determines whether the set of encryption parameters contained in the encryption operation request includes an indication of a cryptographic key that is to be used by the encryption service module to transform the contents of the plaintext buffer into ciphertext. In response to determining that the set of parameters in the encryption operation request does not include an indication of a cryptographic key that is to be used to transform the contents of the plaintext buffer into ciphertext, the encryption service module performs an encryption operation at least in part by i) retrieving a current cryptographic key stored within a key store located in the data encrypting system, ii) using the current cryptographic key and an associated cryptographic algorithm to encrypt the contents of the plaintext buffer by transforming the contents of the plaintext buffer into ciphertext, iii) creating an encrypted data object that includes the ciphertext and a key identifier that uniquely identifies the current cryptographic key and the associated cryptographic algorithm that were used to encrypt the contents of the plaintext buffer, and iv) storing the encrypted data object into the ciphertext output buffer.

A decryption operation request is subsequently received from a decrypting consumer process. The decryption operation request includes a set of decryption parameters, which may include a location of a ciphertext buffer containing the encrypted data object, and a location of a plaintext output buffer for storing plaintext resulting from decrypting the ciphertext contained in the encrypted data object. A determination is made as to whether the set of decryption parameters in the decryption operation request includes an indication of a cryptographic key that is to be used to transform the ciphertext contained in the encrypted data object into plaintext. In response to determining that the set of decryption parameters in the decryption operation request does not include an indication of a cryptographic key that is to be used to transform the ciphertext contained in the encrypted data object into plaintext, a decryption operation is performed at least in part by i) extracting the key identifier from the encrypted data object, ii) using the extracted key identifier to retrieve a cryptographic key indicated by the extracted key identifier, iii) using the extracted key identifier to identify a cryptographic algorithm associated with the retrieved cryptographic key, iv) using the retrieved cryptographic key and the identified cryptographic algorithm to decrypt the ciphertext contained in the encrypted data object by transforming the ciphertext contained in the encrypted data object into plaintext, and v) storing the plaintext into the plaintext output buffer.

The decryption operation request may be received by the encryption service module executing on processing circuitry contained in the data encrypting system, and the location of the ciphertext buffer containing the encrypted data object and the location of the plaintext output buffer may be locations within the memory of the data encrypting system. The encryption service module executing on the processing circuitry contained in the data encrypting system may accordingly perform the decryption operation. In such an example, the cryptographic key indicated by the extracted key identifier may be retrieved from the key store located in the data encrypting system.

Alternatively, in an example in which the data encrypting system is a first data encrypting system contained within a cluster of multiple interconnected data encrypting systems that further includes at least a second data encrypting system, the contents of the key store located in the first data encrypting system may be synchronized with the contents of a key store located in the second data encrypting system. Such synchronizing may include copying of the current cryptographic key from the key store located in the first data encrypting system to the key store located in the second data encrypting system. After such synchronization, the encrypted data object may be transmitted from the first data encrypting system to the second data encrypting system, and the decryption operation request may be received by an encryption service module executing on processing circuitry contained in the second data encrypting system from a decrypting consumer process also executing on the processing circuitry contained in the second data encrypting system. The location of the ciphertext buffer containing the encrypted data object and the location of the plaintext output buffer may be locations within a memory of the second data encrypting system. The encryption service module executing on the processing circuitry contained in the second data encrypting system may perform the decryption operation. In such an example, the cryptographic key indicated by the extracted key identifier may be retrieved from the key store located in the second data encrypting system.

In some embodiments, performing the encryption operation may further include generating a random initialization vector, and using the generated initialization vector with the current cryptographic key and associated cryptographic algorithm to encrypt the contents of the plaintext buffer. In such embodiments, the encrypted data object may be created such that the encrypted data object further includes the initialization vector. Further in such embodiments, performing the decryption operation may additionally include extracting the initialization vector from the encrypted data object, and using the initialization vector with the retrieved cryptographic key and identified cryptographic algorithm to decrypt the ciphertext contained in the encrypted data object.

In some embodiments, performing the encryption operation may further include generating an integrity check value by applying a cryptographic hash function to the combination of the ciphertext and the initialization vector, and creating the encrypted data object such that the encrypted data object further includes the integrity check value. In such embodiments, performing the decryption operation may further include, prior to decrypting the ciphertext contained in the encrypted data object, i) extracting the integrity check value from the encrypted data object, ii) using the integrity check value to check the validity of the ciphertext and initialization vector, and iii) only decrypting the ciphertext contained in the encrypted data object responsive to determining, based on the integrity check value, that the ciphertext and initialization vector are valid.

In some embodiments, an encryption service state change message may be received by the encryption service module after performing the encryption operation, and the encryption service state change message may cause a new version of the current cryptographic key to be used to encrypt plaintext during subsequently performed encryption operations. In such embodiments, performing the decryption operation may further include determining whether the retrieved cryptographic key is the most recent version of the retrieved cryptographic key, and, in response to determining that the retrieved cryptographic key is not the most recent version of the retrieved cryptographic key, issuing a completion status to the decrypting consumer process indicating that the retrieved cryptographic key is not the most recent version of the retrieved cryptographic key. The completion status indicating that the retrieved cryptographic key is not the most recent version of the retrieved cryptographic key may cause the decrypting consumer process to issue an encryption operation request to the encryption service module to cause the encryption service module to re-encrypt the plaintext stored in the plaintext output buffer using the new version of the current cryptographic key.

In some embodiments, a second encryption operation request may be received from an encrypting consumer process. The second encryption operation request may include a set of encryption parameters including a location of a second plaintext buffer in a memory of the data encrypting system, a location of a second ciphertext output buffer in the memory of the data encrypting system for storing ciphertext resulting from encrypting the contents of the second plaintext buffer, and a length of the second output buffer in the memory of the data encrypting system for storing ciphertext resulting from encrypting the contents of the second plaintext buffer. In response to determining that the set of parameters in the second encryption operation request does not include an indication of a cryptographic key that is to be used by the encryption service module to transform the contents of the second plaintext buffer into ciphertext, the encryption service module may perform a second encryption operation at least in part by i) retrieving the current cryptographic key stored within the key store located in the data encrypting system, ii) using the current cryptographic key and an associated cryptographic algorithm to encrypt the contents of the second plaintext buffer by transforming the contents of the second plaintext buffer into ciphertext, iii) comparing a length of the ciphertext to the length of the second output buffer in the memory of the data encrypting system for storing ciphertext, and iv) in response to the length of the ciphertext exceeding the length of the second output buffer in the memory of the data encrypting system for storing ciphertext, issuing a completion status to the encrypting consumer process indicating that the length of the second output buffer in the memory of the data encrypting system for storing ciphertext is too small, and also indicating the length of the ciphertext.

In some embodiments, a second decryption operation request may be received from a decrypting consumer process, including a set of decryption parameters including a location of a second ciphertext buffer containing a second encrypted data object, a location of a second plaintext output buffer for storing plaintext resulting from decrypting ciphertext contained in the second encrypted data object, and a length of the second plaintext output buffer. In such embodiments, in response to determining that the set of decryption parameters in the second decryption operation request does not include an indication of a cryptographic key that is to be used to transform the ciphertext contained in the second encrypted data object into plaintext, a second decryption operation may be performed at least in part by i) extracting a key identifier from the second encrypted data object, ii) using the key identifier extracted from the second encrypted data object to retrieve a cryptographic key indicated by the key identifier extracted from the second encrypted data object, iii) using the key identifier extracted from the second encrypted data object to identify a cryptographic algorithm associated with the cryptographic key retrieved using the key identifier extracted from the second encrypted data object, iv) using the cryptographic key retrieved using the key identifier extracted from the second encrypted data object and the cryptographic algorithm identified using the key identifier extracted from the second encrypted data object to decrypt the ciphertext contained in the second encrypted data object by transforming the ciphertext contained in the second encrypted data object into plaintext, v) comparing a length of the plaintext to the length of the second plaintext output buffer, and vi) responsive to the length of the plaintext exceeding the length of the second plaintext output buffer, issuing a completion status to the decrypting consumer process indicating that the length of the second plaintext output buffer is too small, and indicating the length of the plaintext.

Embodiments of the disclosed technology may provide significant advantages over previous technical solutions. Specifically, embodiments of the disclosed technology may address the shortcomings of previous technology with regard to the impact of changes to keys and/or encryption algorithms on processes that use the disclosed encryption service. Using the disclosed technology, when a key changes, e.g. resulting from a key rollover, key compromise, and/or a security policy change, the processes that invoke the encryption operations provided by the disclosed encryption service need not be modified in order to use the new version of the key. In embodiments in which key stores can be synchronized across multiple data encrypting systems within a cluster, an encrypted data object may be transmitted from one data encrypting system to another within the cluster, and be decrypted by a consumer process executing on the recipient data encrypting system, without having to inform the decrypting consumer process as to which specific key was used to encrypt the ciphertext contained in the encrypted data object. Embodiments that provide integrity check values within the encrypted data object advantageously provide assurance that only legitimate ciphertext will be decrypted. Embodiments that provide a decrypting consumer process with an indication that a more recent version exists of the key that the encryption service module used to perform a decryption operation advantageously enable the decrypting consumer process to promptly re-encrypt the plaintext resulting from a decryption operation using the most recent key. And embodiments that return a length of encrypted data object resulting from an encryption operation, and/or the length of plaintext resulting from a decryption operation, in the event that the output buffer provided by the consumer process was too small, enable the consumer process to first issue an operation request with a zero length buffer, and based on the length returned by the encryption service module, issue a second operation request with an output buffer having a length that matches the length returned in response to the first operation request, thus avoiding the wasteful allocation of excessively large output buffers.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram showing an example of a set of parameters included in a decryption operation request in some embodiments;

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
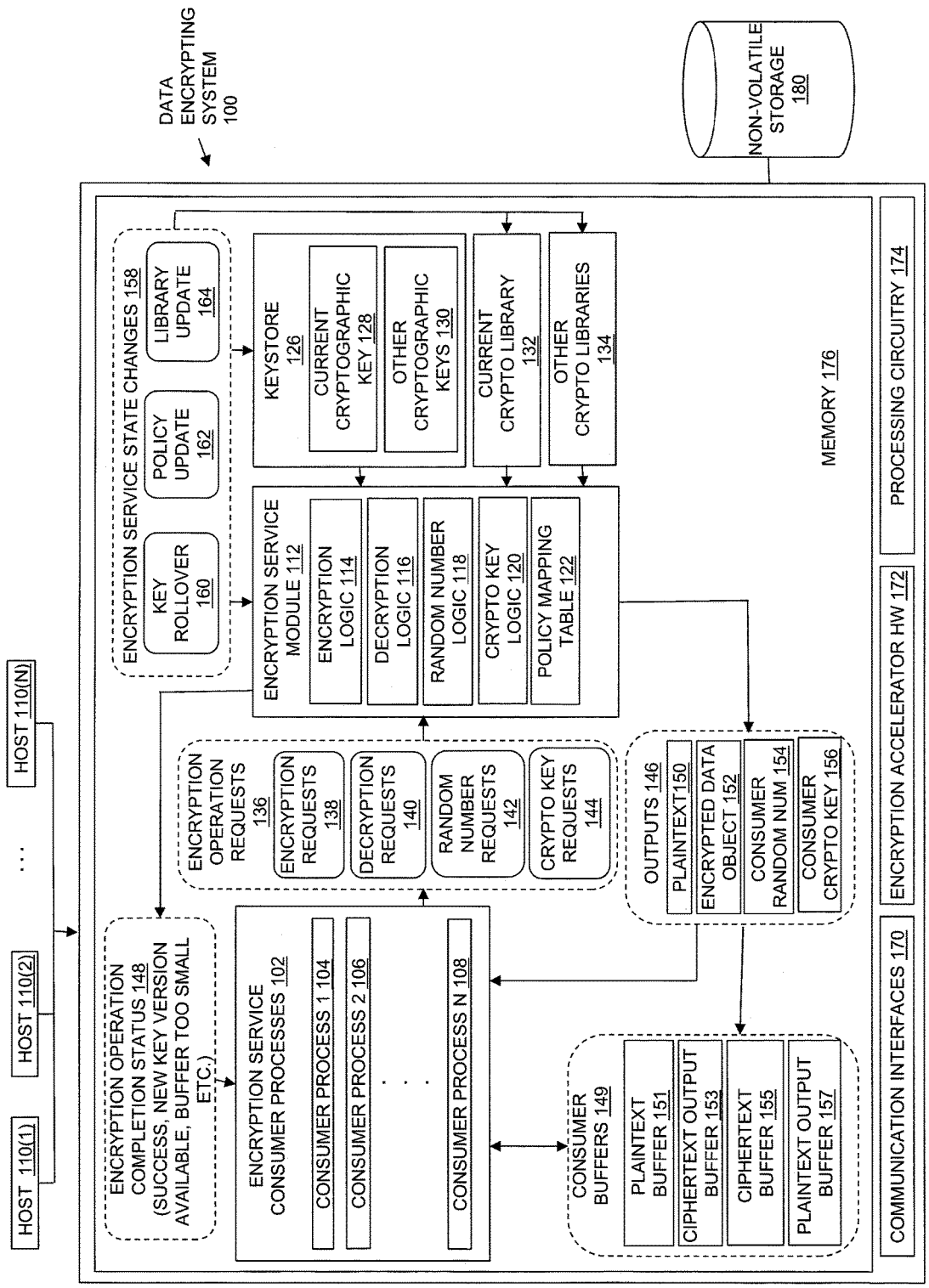
FIG. 1 is a block diagram showing a first view of an operational environment for the disclosed technology, including an example of a data encrypting system.

FIG. 1 is a block diagram showing a first view of an operational environment for the disclosed technology, including an example of a Data Encrypting System 100. Data Encrypting System 100 includes a Memory 176 that stores program code that is executable on Processing Circuitry 174. Memory 176 may include volatile memory (e.g. RAM), and/or other types of memory. The Processing Circuitry 174 may, for example, include or consist of one or more microprocessors, e.g. central processing units (CPUs), multi-core processors, chips, and/or assemblies, and associated circuitry. Processing Circuitry 174 and Memory 176 together form control circuitry, which is configured and arranged to carry out various methods and functions as described herein. The Memory 176 stores a variety of software components that may be provided in the form of executable program code. For example, as shown in FIG. 1, Memory 176 may include software components such as Encryption Service Consumer Processes 102, Encryption Service Module 112, Current Crypto Library 132, and Other Crypto Libraries 134. When the program code stored in Memory 176 is executed by Processing Circuitry 174, Processing Circuitry 174 is caused to carry out the operations of the software components. Although certain software components are shown and described for purposes of illustration and explanation, those skilled in the art will recognize that Memory 176 may include various other software components, such as an operating system, various applications, other processes, etc.

During operation, Encryption Service Consumer Processes 102 convey Encryption Operation Requests 136 to Encryption Service Module 112. Encryption Service Consumer Processes 102 may include any specific number of processes, as shown by Consumer Process 1 104, Consumer Process 2 106, and so on through Consumer Process N 108. Encryption Service Consumer Processes 102 may include various specific types of processes that use encryption services. For example, Encryption Service Consumer Processes 102 may include or consist of one or more processes that implement the Internet Protocol Security (IPsec) protocol suite, and/or one or more processes that provide automatic encryption of data that is stored onto data storage devices within the Non-Volatile Storage 180 (e.g. host data received by Data Encrypting System 100 from Hosts 110), including processes sometimes referred to as "self-encrypting drive" (SED) processes.

The requests conveyed by Consumer Processes 102 to Encryption Service Module 112 may include requests for encryption operations, shown by Encryption Requests 138, requests for decryption operations, shown by Decryption Requests 140, requests for random numbers, shown by Random Number Requests 142, and/or requests for cryptographic keys, shown by Crypto Key Requests 144.

Encryption Service Module 112 is shown including Encryption Logic 114 for processing Encryption Requests 138, Decryption Logic 116 for processing Decryption Requests 140, Random Number Logic 118 for processing Random Number Requests 142, and Crypto Key Logic 120 for processing Crypto Key Requests 144.

A Policy Mapping Table 122 may be used by Encryption Service Module 112 to retrieve specific cryptographic keys from KeyStore 126 that are to be used while processing those encryption requests in Encryption Requests 138 that include a text name of an encryption policy as a parameter. For example, Policy Mapping Table 122 may include entries that map specific encryption policy names to corresponding cryptographic keys that are to be used for encrypting data when processing encryption requests that include the corresponding encryption policy name. Similarly, Policy Mapping Table 122 may be used by Encryption Service Module 112 to retrieve specific cryptographic keys from KeyStore 126 that are to be used while processing those decryption requests in Decryption Requests 140 that include a text name of an encryption policy as a parameter. For example, Policy Mapping Table 122 may include entries that map specific encryption policy names to corresponding cryptographic keys that are to be used for decrypting data when processing decryption requests that include the corresponding encryption policy name KeyStore 126 is a repository of cryptographic keys, such as a secure key database or the like. The cryptographic keys stored in KeyStore 126 may, for example consist of or include one or more symmetric encryption keys, and/or one or more private keys uniquely associated with the Data Encrypting System 100, and/or one or more public key certificates received from other entities (e.g. from other data encrypting systems, from Hosts 110, etc.). The KeyStore 126 is configured and arranged such that one key or key pair stored in KeyStore 126 is indicated as the "current" cryptographic key, as shown for purposes of illustration in FIG. 1 by Current Cryptographic Key 128. As further described below, Encryption Logic 114 may use Current Cryptographic Key 128 in response to determining that the set of parameters in a request for an encryption operation (e.g. one of Encryption Requests 138) received from a consumer process in Encryption Service Consumer Processes 102 does not contain or otherwise indicate a specific cryptographic key to be used during the encryption operation. Similarly, Decryption Logic 116 may use Current Cryptographic Key 128 in response to determining that the set of parameters in a request for a decryption operation (e.g. one of Decryption Requests 140) received from a consumer process in Encryption Service Consumer Processes 102 does not contain or otherwise indicate a specific cryptographic key to be used during the decryption operation In addition to Current Cryptographic Key 128, KeyStore 126 further contains other cryptographic keys, shown by Other Cryptographic Keys 130. Other Cryptographic Keys 130 may, for example, include previous versions of Current Cryptographic Key 128, and/or other cryptographic keys or key pairs. In some embodiments or configurations, Current Cryptographic Key 128 may be a master key that may be used to encrypt Other Cryptographic Keys 130.

Current Crypto Library 132 includes program logic that embodies one or more cryptographic algorithms that are associated with Current Cryptographic Key 128, and that are used by Encryption Service Module 112 when performing encryption operations and decryption operations with Current Cryptographic Key 128. Other Crypto Libraries 134 includes program logic that embodies one or more cryptographic algorithms that are associated with Other Cryptographic Keys 130, and that are used by Encryption Service Module 112 when performing encryption operations and decryption operations with cryptographic keys within Other Cryptographic Keys 130. Current Crypto Library 132 and/or Other Crypto Libraries 134 may, for example, include program logic that embodies various specific cryptographic algorithms. In some embodiments, Current Crypto Library 132 and/or Other Crypto Libraries 134 embody algorithms specified by the Advanced Encryption Standard (AES), and may use cryptographic keys of various lengths, e.g. keys having lengths of 128, 192 or 256 bits. In some embodiments, Current Crypto Library 132 and/or Other Crypto Libraries 134 may consist of or include the RSA B SAFE validated cryptography library, developed by RSA Security LLC, a subsidiary of Dell Technologies, Inc.

While performing operations in response to receipt of Encryption Operation Requests 136, Encryption Service Module 112 may generate Outputs 146, which may be stored into Consumer Buffers 149 and/or passed directly back to the individual consumer process that issued the request for the encryption operation.

For example, Encrypted Data Object 152 may be generated when an encryption operation is performed by Encryption Logic 114, and then stored into Ciphertext Output Buffer 153.

In another example, Plaintext 150 may be generated when a decryption operation is performed by Decryption Logic 116, and then stored into Plaintext Output Buffer 157.

In another example, Consumer Random Number 154 may be generated by Random Number Logic 118 in response to receipt of one of Random Number Requests 142, and then passed back to the consumer process in Encryption Service Consumer Processes 102 that issued that one of the Random Number Requests 142.

And in another example, a Consumer Cryptographic Key 156 may be generated by Cryptographic Key Logic 120 in response to receipt of one of Cryptographic Key Requests 144, and then passed back to the consumer process in Encryption Service Consumer Processes 102 that issued that one of the Cryptographic Key Requests 144.

After each cryptographic operation is performed by Encryption Service Module 112, Encryption Service Module 112 may generate a completion status for the operation, as shown by Encryption Operation Completion Status 148. In the case where the cryptographic operation was completed successfully, Encryption Operation Completion Status 148 may include or consist of an indication that the operation completed successfully (e.g. the text "Success"). In the case where Decryption Logic 116 performs a decryption operation and determines that a newer version of the cryptographic key that was used to perform the decryption operation is available (e.g. is stored in KeyStore 126), Encryption Operation Completion Status 148 may include or consist of a status indicating that the newer version of the cryptographic key is available (e.g. the text "New Key Version Available").

In the case where Encryption Logic 114 performs an encryption operation and determines that the length of the output buffer indicated in the set of parameters in the encryption operation request (e.g. Ciphertext Output Buffer 153) is smaller than the length of the encrypted data object, Encryption Operation Completion Status 148 may include or consist of a status indicating that output buffer is too small to store the encrypted data object (e.g. the text "Buffer too Small"), and also include or indicate a total length of the encrypted data object. In the case where Decryption Logic 116 performs a decryption operation and determines that the length of the output buffer indicated in the set of parameters in the decryption operation request (e.g. Plaintext Output Buffer 157) is smaller than the length of the plaintext resulting from the decryption operation, Encryption Operation Completion Status 148 may include or consist of a status indicating that output buffer is too small to store the plaintext (e.g. the text "Buffer too Small"), and also include or indicate a total length of the plaintext resulting from the decryption operation.

Also in FIG. 1, Encryption Service State Changes 158 shows examples of messages that may be received by and/or operations that may be performed on Encryption Service Module 112, KeyStore 126, Current Cryptographic Library 132, and/or Other Cryptographic Libraries 134. Any one of Encryption Service State Changes 158 may cause one or more cryptographic keys in Key Store 126, and/or associated cryptographic program logic in Current Cryptographic Library 132 and/or Other Cryptographic Libraries 134, to be changed to a newer version. For example, Current Cryptographic Key 128 may be updated to a newer (e.g. longer) version that provides an increased level of security, while a copy of the old version is moved to and maintained in Other Cryptographic Keys 130.

For example, Key Rollover 160 may consist of a message send to Encryption Service Module 112 indicating that Current Cryptographic Key 128 and/or one or more of the Other Cryptographic Keys 130 has expired, and may include a new version of the expired cryptographic key that is to be stored in KeyStore 126 and used instead of the expired cryptographic key when performing subsequent encryption operations.

In another example, Policy Update 162 may change the requirements of an existing encryption policy. For example, some embodiments of the disclosed technology may support multiple different encryption policies, each one of which is associated with a unique text string policy identifier. Such different encryption policies may, for example, each be applicable to cryptographic operations performed within a corresponding geographic region, such as an individual country. For example, an encryption policy applicable to cryptographic operations performed within China may be associated with a text string policy identifier of "China" or the like. Policy Update 162 may update the encryption policy applicable to cryptographic operations performed within China by indicating that subsequent encryption operations performed in response to receipt of encryption operation requests that have a set of parameters that includes the text string policy identifier of "China" must use a new version of Current Cryptographic Key 128, i.e. a more secure (e.g. longer) cryptographic key.

In another example, Library Update 164 may update one or more of Current Cryptographic Library 132 and/or Other Cryptographic Libraries 134. For example, some embodiments of the disclosed technology may support the updating of cryptographic libraries and associated cryptographic keys transparently with regard to Encryption Service Consumer Processes 102. In such embodiments, Library Update 164 may cause a new version of Current Cryptographic Library 132 and/or Other Cryptographic Libraries 134 to be installed in Memory 176, e.g. a new version Current Cryptographic Library 132 and/or Other Cryptographic Libraries 134 that requires the use of new, longer versions of Current Cryptographic Key 128 and/or new longer versions of Other Cryptographic Keys 130. In another example, Library Update 164 may cause a version of Current Cryptographic Library 132 and/or Other Cryptographic Libraries 134 to be installed in Memory 176 that utilizes Encryption Accelerator Hardware 172, e.g. a new version Current Cryptographic Library 132 and/or Other Cryptographic Libraries 134 that uses a new, longer version of Current Cryptographic Key 128 and/or new longer versions of Other Cryptographic Keys 130, and that utilizes Encryption Accelerator Hardware 172 to more quickly perform cryptographic operations based on such longer keys.

In some embodiments, Data Encrypting System 100 may be included in or consist of a data storage system. In such embodiments, some number of Host Computing Devices 110, referred to as "hosts" and shown for purposes of illustration by Hosts 110(1) through 110(N), are provided with access to non-volatile data storage through Data Encrypting System 100, for example over one or more computer networks, such as a local area network (LAN), and/or a wide area network (WAN) such as the Internet. In such an embodiment, Data Encrypting System 100 may be communicably coupled to an array of non-volatile data storage drives that are used to store host data received from Hosts 110, and that are shown for purposes of illustration in FIG. 1 by Non-Volatile Storage 180. Non-Volatile Storage 180 may include data storage drives such as magnetic disk drives, solid state drives, hybrid drives, and/or optical drives. Further in such embodiments, Data Encrypting System 100 may also be capable of processing specific host input/output (I/O) operations received from Hosts 110 (e.g. I/O read and I/O write operations, create storage object operations, delete storage object operations, etc.).

During operation of the components shown in FIG. 1, one of Encryption Service Consumer Processes 102 (e.g. Consumer Process 1 104) may operate as an encrypting consumer process, and may generate an encryption operation request, e.g. one of Encryption Requests 138. The encryption operation request may be sent from the encrypting consumer process and be received by Encryption Service Module 112. The encryption operation request may include a set of encryption parameters. The set of encryption parameters included in the encryption operation request may include a location in Memory 176 of a plaintext buffer, e.g. Plaintext Buffer 151, as well as a location in Memory 176 of a ciphertext output buffer, e.g. Ciphertext Output Buffer 153, for storing ciphertext resulting from encrypting the contents of the plaintext buffer. The contents of Plaintext Buffer 151 may consist of or include various types of data, including for example host data received in previous write I/O operations received from one or more of Hosts 110 that is to be encrypted and then stored in Non-Volatile Storage 180, host data previously stored in Non-Volatile Storage 180 that is to be encrypted and then transmitted back to one or more of Hosts 110 in connection with processing one or more read I/O operations received from Hosts 110, one or more cryptographic keys that are to be encrypted using Current Cryptographic Key 128 and then stored at least in KeyStore 126, and/or some other specific type of data that is to be encrypted.

Encryption Logic 114 in Service Module 112 determines whether the set of encryption parameters in the encryption operation request includes an indication of a cryptographic key that is to be used by Encryption Logic 114 to transform the contents of the plaintext buffer into ciphertext. In response to determining that the set of parameters in the encryption operation request does not include an indication of a cryptographic key that is to be used to transform the contents of the plaintext buffer into ciphertext, Encryption Logic 114 performs an encryption operation at least in part by i) retrieving Current Cryptographic Key 128 from KeyStore 126, ii) using Current Cryptographic Key 128 and an associated cryptographic algorithm embodied in Current Cryptographic Library 132 to encrypt the contents of Plaintext Buffer 151 by transforming the contents of Plaintext Buffer 151 into ciphertext, iii) creating Encrypted Data Object 152 that includes the ciphertext and a key identifier that uniquely identifies Current Cryptographic Key 128 and the associated cryptographic algorithm embodied in Current Cryptographic Library 132 that were used to encrypt the contents of the plaintext buffer, and iv) storing the Encrypted Data Object 152 into Ciphertext Output Buffer 153.

Figure 2:
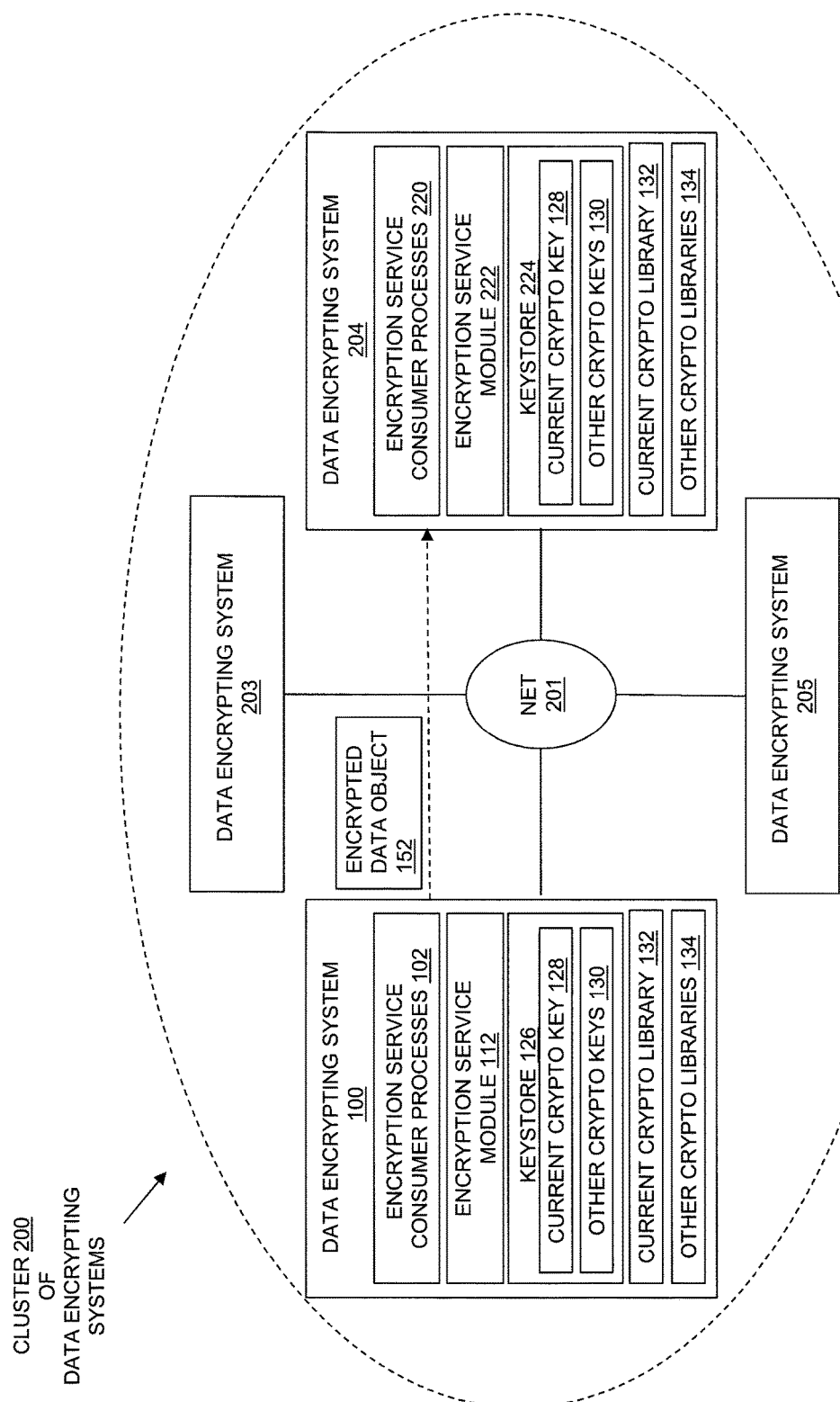
FIG. 2 is a block diagram showing an operational environment for the disclosed technology that includes a cluster of communicably interconnected data encrypting systems.

A decryption operation request is subsequently received from a consumer process operating as a decrypting consumer process. The decrypting consumer process may be the same as the encrypting consumer process, or may be a different consumer process. The decrypting consumer process may be another one of the Encryption Service Consumer Processes 102 executing in Data Encrypting System 100, or may be a consumer process executing in another data encrypting system that is communicably coupled to Data Encrypting System 100, e.g. within a cluster of data encrypting systems as shown in FIG. 2.

In the case where the decrypting consumer process is executing in Data Encrypting System 100, the decryption operation request may be one of Decryption Requests 140, and may be received by the Encryption Service Module 112. In the case where the decrypting consumer process is executing in another data encrypting system, the decryption operation request may be received by an encryption service module also executing in the other data encrypting system.

The decryption operation request includes a set of decryption parameters, which may include a location of a ciphertext buffer containing the encrypted data object, e.g. Ciphertext Buffer 155, and a location of a plaintext output buffer, e.g. Plaintext Output Buffer 157, for storing plaintext resulting from decrypting the ciphertext contained in the encrypted data object stored in the ciphertext buffer. In some examples, the encrypted data object may be located within the same buffer into which it was originally stored, and Ciphertext Buffer 155 may be the same as Ciphertext Output Buffer 153. Alternatively, the encrypted object may have been moved or copied from Ciphertext Output Buffer 153 to different memory buffer, e.g. Ciphertext Buffer 155, prior to issuance of the decryption operation request.

A determination is made by the decryption logic of the encryption service module that received the decryption operation request (e.g. Decryption Logic 116 of Encryption Service Module 112, or the decryption logic of the encryption service module in another data encrypting system), as to whether the set of decryption parameters in the decryption operation request includes an indication of a cryptographic key that is to be used to transform the ciphertext contained in the encrypted data object into plaintext. In response to determining that the set of decryption parameters in the decryption operation request does not include an indication of a cryptographic key that is to be used to transform the ciphertext contained in the encrypted data object into plaintext, the decryption logic performs a decryption operation at least in part by i) extracting the key identifier from the encrypted data object, ii) using the extracted key identifier to retrieve a cryptographic key indicated by the extracted key identifier from a local key store (e.g. Current Cryptographic Key 128 from KeyStore 126, or a copy of Current Cryptographic Key 128 stored in a key store in another data encrypting system), iii) using the extracted key identifier to identify a cryptographic algorithm associated with the retrieved cryptographic key (e.g. a cryptographic algorithm associated with Current Cryptographic Key 128 and embodied in either Current Cryptographic Library 132 or a cryptographic library loaded on another data encrypting system), iv) using the retrieved cryptographic key and the identified cryptographic algorithm to decrypt the ciphertext contained in the encrypted data object by transforming the ciphertext contained in the encrypted data object into plaintext, and v) storing the resulting plaintext into the plaintext output buffer indicated in the set of decryption parameters in the decryption operation (e.g. Plaintext Output Buffer 157 or a plaintext output buffer in the memory of another data encrypting system).

In an example of operation in which the decryption operation request is received by the Encryption Service Module 112 executing on the Processing Circuitry 174 contained in the Data Encrypting System 100, the location of the ciphertext buffer containing the encrypted data object and the location of the plaintext output buffer may be locations within the Memory 176 of the Data Encrypting System 100, as shown in FIG. 1 by Ciphertext Buffer 155 and Plaintext Output Buffer 157. In such a case, the Decryption Logic 116 in Encryption Service Module 112 may accordingly determine whether the set of decryption parameters in the decryption operation request includes an indication of a cryptographic key that is to be used to transform the contents of the plaintext buffer into ciphertext, determine that the set of decryption parameters in the decryption operation request does not include an indication of a cryptographic key that is to be used to transform the ciphertext contained in the encrypted data object into plaintext, and perform the decryption operation. And also in such an example of operation, the cryptographic key indicated by the extracted key identifier may be retrieved from the KeyStore 126 that is located in the data encrypting system.

FIG. 2 illustrates an alternative example of operation in which the Data Encrypting System 100 is a first data encrypting system contained within a cluster of multiple interconnected data encrypting systems, shown by Cluster 200. As shown in FIG. 2, in addition to Data Encrypting System 100, the Cluster 200 includes Data Encrypting System 203, Data Encrypting System 204, and Data Encrypting System 205. Data Encrypting System 100, Data Encrypting System 203, Data Encrypting System 204, and Data Encrypting System 205 are all communicably interconnected by one or more communication networks, shown by Network 201.

Further with reference to FIG. 2, Data Encrypting System 204 includes Encryption Service Consumer Processes 220 Encryption Service Module 222 that execute on processing circuitry contained within Data Encrypting System 204. Data Encrypting System 204 also includes a KeyStore 224 located in a memory of Data Encrypting System 204. The KeyStore 224 includes a copy of Current Cryptographic Key 128, and copies of Other Cryptographic Keys 130. Data Encrypting System 204 also includes copies of Current Cryptographic Library 132 and Other Cryptographic Libraries 134. For example, Current Cryptographic Key 128 and Other Cryptographic Keys 130 may be copied from KeyStore 126 in Data Encrypting System 100 to KeyStore 224 in Data Encrypting System 204 during a synchronization operation in which the contents of KeyStore 126 is copied to key stores in each one of Data Encrypting System 203, Data Encrypting System 204, and Data Encrypting System 205. Similarly, copies of Current Cryptographic Library 132 and Other Cryptographic Library 134 may be installed on all of the data encryption systems in the Cluster 200.

In the example of operation shown in FIG. 2, the Encrypted Data Object 152 may be generated as described above by Encryption Logic 114 in the Encryption Service Module 112 of Data Encrypting System 100, and may then be transmitted from Data Encrypting System 100 to Data Encrypting System 204 after the above-described key store synchronization operation is performed. One of Encryption Service Consumer Processes 220 in Data Encrypting System 204 may operate as the decrypting consumer process, and convey the decryption operation request to Encryption Service Module 222. The location of the ciphertext buffer containing the encrypted data object and the location of the plaintext output buffer may be locations within a memory of Data Encrypting System 204. The decryption logic within Encryption Service Module 222 may perform the decryption operation. The cryptographic key indicated by the extracted key identifier may be retrieved by the decryption logic in Encryption Service Module 222 from KeyStore 224.

Now again with reference to FIG. 1, in some embodiments, each time an encryption operation is performed by the Encryption Logic 114 in Encryption Service Module 112, Encryption Logic 114 may generate a random initialization vector, and use the initialization vector with the Current Cryptographic Key and associated current cryptographic algorithm embodied in Current Cryptographic Library 132 to encrypt the contents of the Plaintext Buffer 151. In such embodiments, the Encrypted Data Object 152 may be created by Encryption Logic 114 such that the Encrypted Data Object 152 further includes the initialization vector generated when the Encrypted Data Object 152 was created. Further in such embodiments, performing the decryption operation by decryption logic in Encryption Service Module 112 or Encryption Service Module 222 may additionally include extracting the initialization vector from the Encrypted Data Object 152, and using the extracted initialization vector with the retrieved cryptographic key and identified cryptographic algorithm to decrypt the ciphertext contained in the Encrypted Data Object 152.

In some embodiments, with reference to FIG. 1, performing the encryption operation by Encryption Logic 114 in Encryption Service Module 112 may further include generating an integrity check value by applying a cryptographic hash function to the combination of the ciphertext and the initialization vector, and creating the encrypted data object such that the encrypted data object further includes the integrity check value. For example, generating the integrity check value may be performed by generating a hash-based message authentication code (HMAC) from the combination of the ciphertext and the initialization vector. The HMAC may, for example, be generated using one of the Secure Hash Algorithms (SHA) published by the National Institute of Standards and Technology (NIST), such as SHA-256 or the like. In such embodiments, performing the decryption operation may further include, prior to decrypting the ciphertext contained in the encrypted data object, i) extracting the integrity check value from the Encrypted Data Object 152, ii) using the integrity check value to check the validity of the ciphertext and initialization vector, and iii) only decrypting the ciphertext contained in the Encrypted Data Object 152 responsive to determining, based on the integrity check value, that the ciphertext and initialization vector are valid.

In some embodiments, again with reference to FIG. 1, one or more of the Encryption State Changes 158 messages may be received by the Encryption Service Module 112 after performing the encryption operation. The encryption service state change message may cause a new version of Current Cryptographic Key 128 to be used by Encryption Logic 114 to encrypt plaintext during subsequently performed encryption operations. In such embodiments, performing the decryption operation may further include Decryption Logic 116 determining whether the retrieved cryptographic key is the most recent version of the retrieved cryptographic key, and, in response to Decryption Logic 116 determining that the retrieved cryptographic key is not the most recent version of the retrieved cryptographic key, issuing an Encryption Operation Completion Status 148 to the decrypting consumer process in Encryption Service Consumer Processes 102 indicating that the retrieved cryptographic key is not the most recent version of the retrieved cryptographic key. In response to receiving the Encryption Operation Completion Status 148 that indicates that the retrieved cryptographic key is not the most recent version of the retrieved cryptographic key, the decrypting consumer process in Encryption Service Consumer Processes 102 may issue an encryption operation request (e.g. one of Encryption Requests 138) to the Encryption Service Module 112 to cause the Encryption Service Module to re-encrypt the plaintext stored in the Plaintext Output Buffer 157 using the new version of the current cryptographic key.

In another example of operation, again with reference to FIG. 1, a second encryption operation request may be received by Encryption Service Module 112 from one of the consumer processes in the Encryption Service Consumer Processes 102 that is operating as an encrypting consumer process. The second encryption operation request may include a set of encryption parameters including a location of a second plaintext buffer in the Memory 176, a location of a second ciphertext output buffer in the Memory 176 for storing ciphertext resulting from encrypting the contents of the second plaintext buffer, and a length of the second output buffer in the memory of the data encrypting system for storing ciphertext resulting from encrypting the contents of the second plaintext buffer. In response to determining that the set of parameters in the second encryption operation request does not include an indication of a cryptographic key that is to be used by the encryption service module to transform the contents of the second plaintext buffer into ciphertext, the Encryption Logic 114 may perform a second encryption operation at least in part by i) retrieving the Current Cryptographic Key 128 from the KeyStore 126, ii) using the Current Cryptographic Key 128 and an associated cryptographic algorithm embodied in Current Cryptographic Library 132 to encrypt the contents of the second plaintext buffer by transforming the contents of the second plaintext buffer into ciphertext, iii) comparing a length of the ciphertext resulting from encrypting the contents of the second plaintext buffer to the length of the second ciphertext output buffer in the Memory 176 for storing ciphertext, and iv) in response to the length of the ciphertext resulting from encrypting the contents of the second plaintext buffer exceeding the length of the second ciphertext output buffer in the Memory 176 for storing ciphertext, issuing an Encryption Operation Completion Status 148 to the encrypting consumer process indicating that the length of the second ciphertext output buffer in the Memory 176 for storing ciphertext is too small, and that also indicates the length of the ciphertext resulting from encrypting the contents of the second plaintext buffer.

In another example of operation, again with reference to FIG. 1, a second decryption operation request may be received by Encryption Service Module 112 from one of the consumer processes in the Encryption Service Consumer Processes 102 that is operating as a decrypting consumer process. The second decryption operation request may include a set of decryption parameters including a location in Memory 176 of a second ciphertext buffer containing a second encrypted data object, a location of a second plaintext output buffer in Memory 176 for storing plaintext resulting from decrypting ciphertext contained in the second encrypted data object, and a length of the second plaintext output buffer. In such embodiments, in response to determining that the set of decryption parameters in the second decryption operation request does not include an indication of a cryptographic key that is to be used to transform the ciphertext contained in the second encrypted data object into plaintext, Decryption Logic 116 may perform a second decryption operation at least in part by i) extracting a key identifier from the second encrypted data object, ii) using the key identifier extracted from the second encrypted data object to retrieve, e.g. from KeyStore 126, a cryptographic key indicated by the key identifier extracted from the second encrypted data object, iii) using the key identifier extracted from the second encrypted data object to identify a cryptographic algorithm associated with the cryptographic key retrieved using the key identifier extracted from the second encrypted data object, iv) using the cryptographic key retrieved from KeyStore 126 using the key identifier extracted from the second encrypted data object and an embodiment of the cryptographic algorithm identified using the key identifier extracted from the second encrypted data object to decrypt the ciphertext contained in the second encrypted data object by transforming the ciphertext contained in the second encrypted data object into plaintext, v) comparing a length of the plaintext resulting from decrypting the ciphertext contained in the second encrypted data object to the length of the second plaintext output buffer, and vi) responsive to the length of the plaintext exceeding the length of the second plaintext output buffer, issuing an Encryption Operation Completion Status 148 to the decrypting consumer process indicating that the length of the second plaintext output buffer is too small, and also including length of the plaintext resulting from decrypting the ciphertext contained in the second encrypted data object to the length of the second plaintext output buffer.

Figure 3:
FIG. 3 is a block diagram showing an example of a set of parameters included in an encryption operation request in some embodiments.

FIG. 3 is a block diagram showing an example of the set of parameters included in an encryption operation request. As shown in FIG. 3, Encryption Operation Request Parameters 300 may optionally include an Encryption Key Identifier 302. When Encryption Key Identifier 302 is included in Encryption Operation Request Parameters 300 by an encrypting consumer process, Encryption Key Identifier 302 identifies a cryptographic key that is to be used to perform the requested encryption operation. Location of Plaintext Buffer 304 is a location (e.g. address) in memory of a plaintext buffer that stores the plaintext that is to be encrypted. Location of Ciphertext Output Buffer 306 is a location (e.g. address) in memory of a ciphertext output buffer that is to be used to store the ciphertext resulting from encrypting the plaintext stored in the plaintext buffer. Plaintext Buffer Length 308 is the length of the plaintext stored in the plaintext buffer indicated by Location of Plaintext Buffer 304. Ciphertext Output Buffer Length 310 is the length of the ciphertext output buffer provided to store the ciphertext resulting from encrypting the plaintext stored in the plaintext buffer indicated by Location of Plaintext Buffer 304. Encryption Operation Request Parameters 300 may optionally include an Encryption Policy Name 312. When Encryption Policy Name 312 is included in Encryption Operation Request Parameters 300 by the encrypting consumer process, Encryption Policy Name 312 identifies an encryption policy which determines the cryptographic key that is to be used to perform the requested encryption operation.

FIG. 4 is a block diagram showing an example of the set of parameters included in a decryption operation request. As shown in FIG. 4, Decryption Operation Request Parameters 400 may optionally include a Decryption Key Identifier 402. When Decryption Key Identifier 402 is included by a decrypting consumer process in Decryption Operation Request Parameters 400, Decryption Key Identifier 402 identifies a cryptographic key that is to be used to perform the requested decryption operation. Location of Ciphertext Buffer 404 is a location (e.g. address) in memory of a ciphertext buffer that stores the ciphertext that is to be decrypted. Location of Plaintext Output Buffer 406 is a location (e.g. address) in memory of a plaintext output buffer that is to be used to store the plaintext resulting from decrypting the ciphertext stored in the ciphertext buffer. Ciphertext Buffer Length 408 is the length of the ciphertext stored in the ciphertext buffer indicated by Location of Ciphertext Buffer 404. Plaintext Output Buffer Length 410 is the length of the plaintext output buffer provided to store the plaintext resulting from decrypting the ciphertext stored in the ciphertext buffer indicated by Location of Ciphertext Buffer 404. Decryption Operation Request Parameters 400 may optionally include an Encryption Policy Name 412. When Encryption Policy Name 412 is included in Decryption Operation Request Parameters 400 by the decrypting consumer process, Encryption Policy Name 412 identifies an encryption policy which determines the cryptographic key that is to be used to perform the requested decryption operation.

Figure 5:
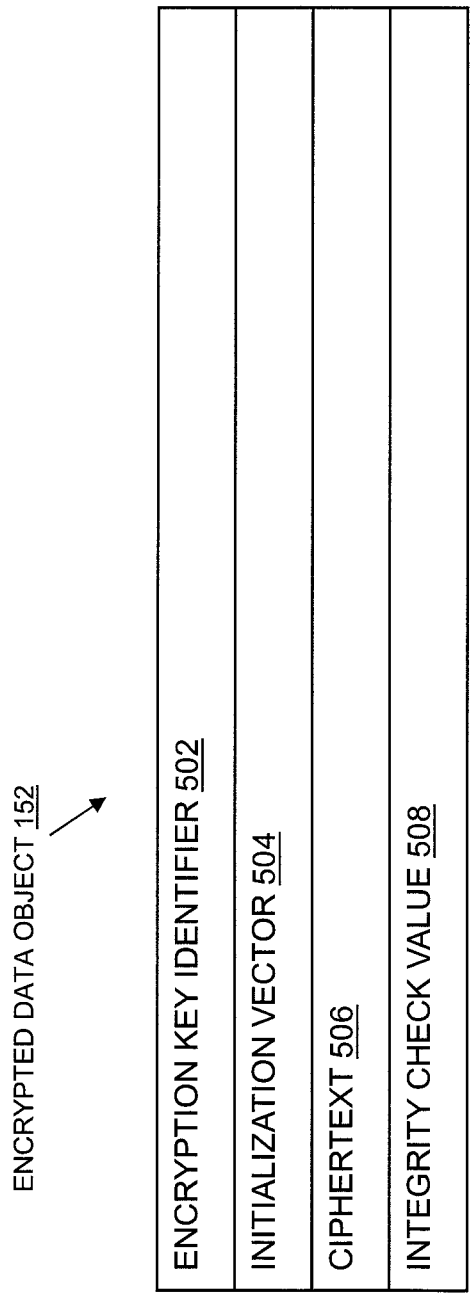
FIG. 5 is a block diagram showing an example of the contents of an encrypted data object in some embodiments.

FIG. 5 is a block diagram showing an example of the contents of an encrypted data object, such as the Encrypted Data Object 152 shown in FIG. 1 and FIG. 2. As shown in FIG. 5, the Encrypted Data Object 152 includes an Encryption Key Identifier 502, which identifies the cryptographic key and cryptographic algorithm that were used to encrypt the Ciphertext 506. For example, Encryption Key Identifier 502 may indicate or include an identifier of the cryptographic algorithm that was used to encrypt the Ciphertext 506, that identifies an embodiment of that cryptographic algorithm in Current Cryptographic Library 132 or Other Cryptographic Libraries 134. Encryption Key Identifier 502 may further include or indicate an identifier of the cryptographic key that was used to encrypt the Ciphertext 506, such as a key name that can be used to retrieve, from the KeyStore 126, the cryptographic key that was used to encrypt the Ciphertext 506. Encrypted Data Object 152 further includes a randomly generated Initialization Vector 504 that was also used to encrypt the Ciphertext 506. The Ciphertext 506 may include or consist of a null-terminated string containing the base64 encoded ciphertext. The Integrity Check Value 508 may include or consist of a hash-based message authentication code (HMAC) generated by Encryption Logic 114 from the combination of the Ciphertext 506 and the Initialization Vector 504, and that may be used by Decryption Logic 116 to validate Ciphertext 506 and Initialization Vector 504 prior to attempting to decrypt Ciphertext 506.

Figure 6:
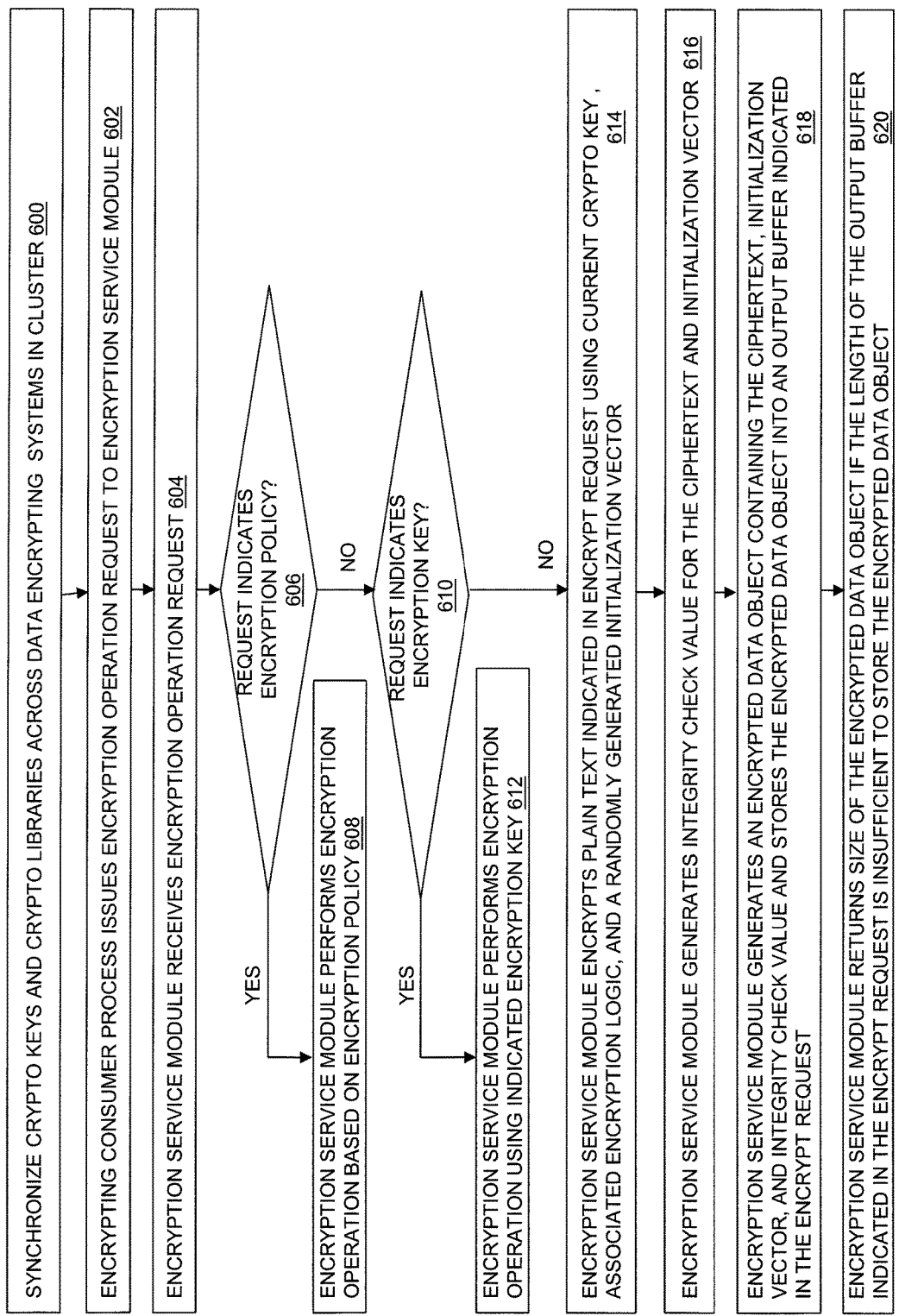
FIG. 6 is a flow chart showing an example of steps performed in some embodiments to process an encryption operation request received by an encryption service module from an encrypting consumer process.

FIG. 6 is a flow chart showing an example of steps performed with regard to processing of an encryption operation request received by an encryption service module from an encrypting consumer process. At step 600 a synchronization step may be performed that ensures that the key stores of multiple data encrypting systems communicably coupled within a cluster have the same contents, e.g. by storing a common set of cryptographic keys into each one of the key stores of the data encrypting systems in the cluster, and that also ensures that a common set of cryptographic libraries is installed in each one of the data encrypting systems in the cluster.

At step 602 an encrypting consumer process issues an encryption operation request to the encryption service module. The encryption service module receives the encryption operation request at step 604. At step 606, the encryption service module determines whether the set of parameters in the encryption operation request includes an indication (e.g. a text name) of an encryption policy that is to be applied to the encryption operation. If so, step 606 is followed by step 608. Otherwise, step 606 is followed by step 610.

In step 608, the requested encryption operation is performed using a cryptographic key associated with the encryption policy indicated in the set of parameters in the encryption operation request. For example, at step 608, the requested encryption operation may be performed using a cryptographic key mapped to the encryption policy by an entry in a policy mapping table. For example, at step 608, the encryption operation described below with reference to steps 614, 616, 618, and 620 may be performed albeit using the cryptographic key associated with the encryption policy indicated in the set of parameters in the encryption operation request.

At step 610, the encryption service module determines whether the set of parameters in the encryption operation request includes an indication (e.g. a text name) of a cryptographic key that is to be used in the encryption operation. If so, step 610 is followed by step 612. Otherwise, step 610 is followed by step 614.

In step 612, the requested encryption operation is performed using a cryptographic key indicated in the set of parameters in the encryption operation request. For example, at step 612, the requested encryption operation may be performed using a cryptographic key retrieved from the key store of the data encrypting system using a key name contained in the set of parameters in the encryption operation request. For example, at step 612, the encryption operation described below with reference to steps 614, 616, 618, and 620 may be performed albeit using the cryptographic key retrieved from the key store of the data encrypting system using the key name contained in the set of parameters in the encryption operation request.

At step 614, the encryption service module encrypts plain text stored in a plaintext buffer indicated in set of parameters in the encryption operation request using a current encryption key stored in the key store of the data encrypting system. For example, at step 614 the encryption service module may identify the current cryptographic key based on an indication in the key store that identifies the current cryptographic key, and also identify a current cryptographic library that embodies a cryptographic algorithm associated with the current cryptographic key. The encryption service module may further generate a random initialization vector value, and use the current cryptographic key, embodiment of the cryptographic algorithm associated with the current cryptographic key, and randomly generated initialization vector to encrypt the contents of the plaintext buffer indicated in the set of parameters in the encryption operation request. For example, the encryption performed at step 614 may be based on one or more of the algorithms specified by the Advanced Encryption Standard (AES), and may use a current cryptographic key of 256 bits in length.

At step 616, the encryption service module generates an integrity check value based on the combination of the randomly generated initialization vector used to generate the ciphertext at step 614, and the ciphertext itself. For example, the integrity check value generated at step 616 may be a hash-based message authentication code (HMAC) generated from the combination of the ciphertext and the initialization vector. The HMAC may, for example, be generated using one of the Secure Hash Algorithms (SHA) published by the National Institute of Standards and Technology (NIST), such as SHA-256.

At step 618, the encryption service module generates an encrypted data object consisting of the ciphertext and initialization vector generated at step 614, and the integrity check value generated at step 616. Further at step 618, in the case where the ciphertext output buffer indicated in the set of parameters in the encryption operation request is sufficiently large to store the encrypted data object, the encryption service module stores the encrypted data object into a ciphertext output buffer indicated in the set of parameters in the encryption operation request.

At step 620, the encryption service module operates in response to a determination that the length of the ciphertext output buffer indicated in the set of parameters in the encryption operation request is too small to store the encrypted data object, by returning, to the encrypting consumer process, a completion status indicating that the ciphertext output buffer indicated in the set of parameters in the encryption operation request is too small to store the encrypted data object, and also containing the length of the encrypted data object.

By returning a length of the encrypted data object at step 620 in response to determining that ciphertext output buffer provided by the encrypting consumer process was too small, the encryption service module enables the encrypting consumer process to first issue an encryption operation request with a zero length ciphertext output buffer, and based on the encrypted data object length returned by the encryption service module, issue a second encryption operation request with a ciphertext output buffer having a length that matches the encrypted data object length returned in response to the first encryption operation request, thus avoiding the wasteful allocation of excessively large output buffers to store encrypted data objects.

Figure 7:
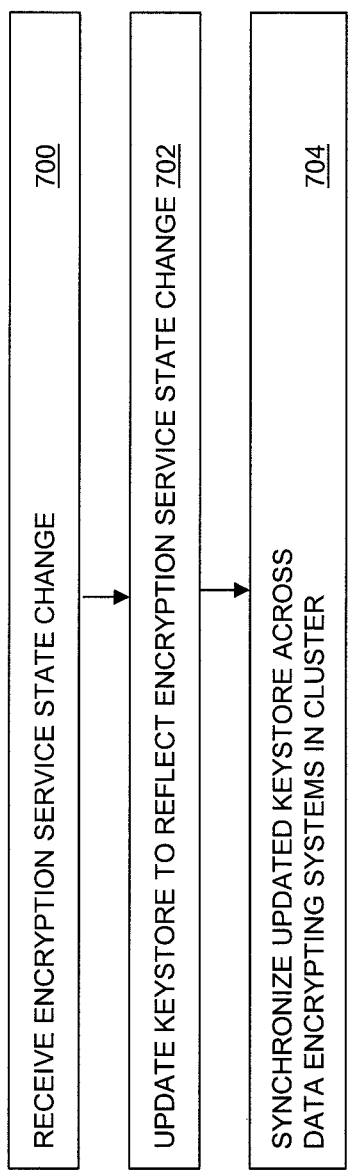
FIG. 7 is a flow chart showing an example of steps performed in some embodiments by an encryption service module in response to receipt of an encryption service state change.

FIG. 7 is a flow chart showing an example of steps performed by an encryption service module in response to receipt of an encryption service state change. In some examples of the operation of the disclosed technology, the steps of FIG. 7 may be performed after the steps of FIG. 6, and before the steps of FIG. 8. As shown in FIG. 7, at step 700 an encryption state change message may be received. The encryption state change message received at step 700 indicates that a new version of the current cryptographic is to be used to encrypt plaintext during subsequently performed encryption operations responsive to encryption operation requests having no indication of a cryptographic key in their parameter set. For example, one of the Encryption Service State Changes 158 shown in FIG. 1 may be received at step 700.

At step 702, in response to the state change message received at step 700, the encryption service module loads the new version of the current cryptographic key into the key store, and stores an indication in the key store that the new version is now the current cryptographic key. The old version of the cryptographic key is also stored in the key store, so that the old version can be used to decrypt ciphertext generated using the old version. The new version and the old version of the cryptographic key have different key identifiers. Since the new version and the old version of the cryptographic key have different key identifiers, and since encrypted data objects generated by the encryption service module store the key identifier of cryptographic key that was used to generate the ciphertext they contain, decryption operations can subsequently be performed successfully using either version of the key. In other words, encrypted data objects containing ciphertext generated using the old version of the cryptographic key will contain the key identifier for the old version of the key, allowing decryption operations to retrieve the old version and use the old version of the key to decrypt the ciphertext contained in those encrypted data objects. Encrypted data objects containing ciphertext generated using the new version of the cryptographic key will contain the key identifier for the new version of the key, allowing decryption operations to retrieve the new version of the key and use the old version of the key to decrypt the ciphertext contained in those encrypted data objects.

At step 704, in embodiments in which the data encrypting system is one of multiple data encrypting systems contained in a cluster of data encrypting systems, the contents of the key store, including the new version of the current cryptographic key, and including the indication that the new version is the new current cryptographic key, is copied to the key stores of the other data encrypting systems in the cluster.

Figure 8:
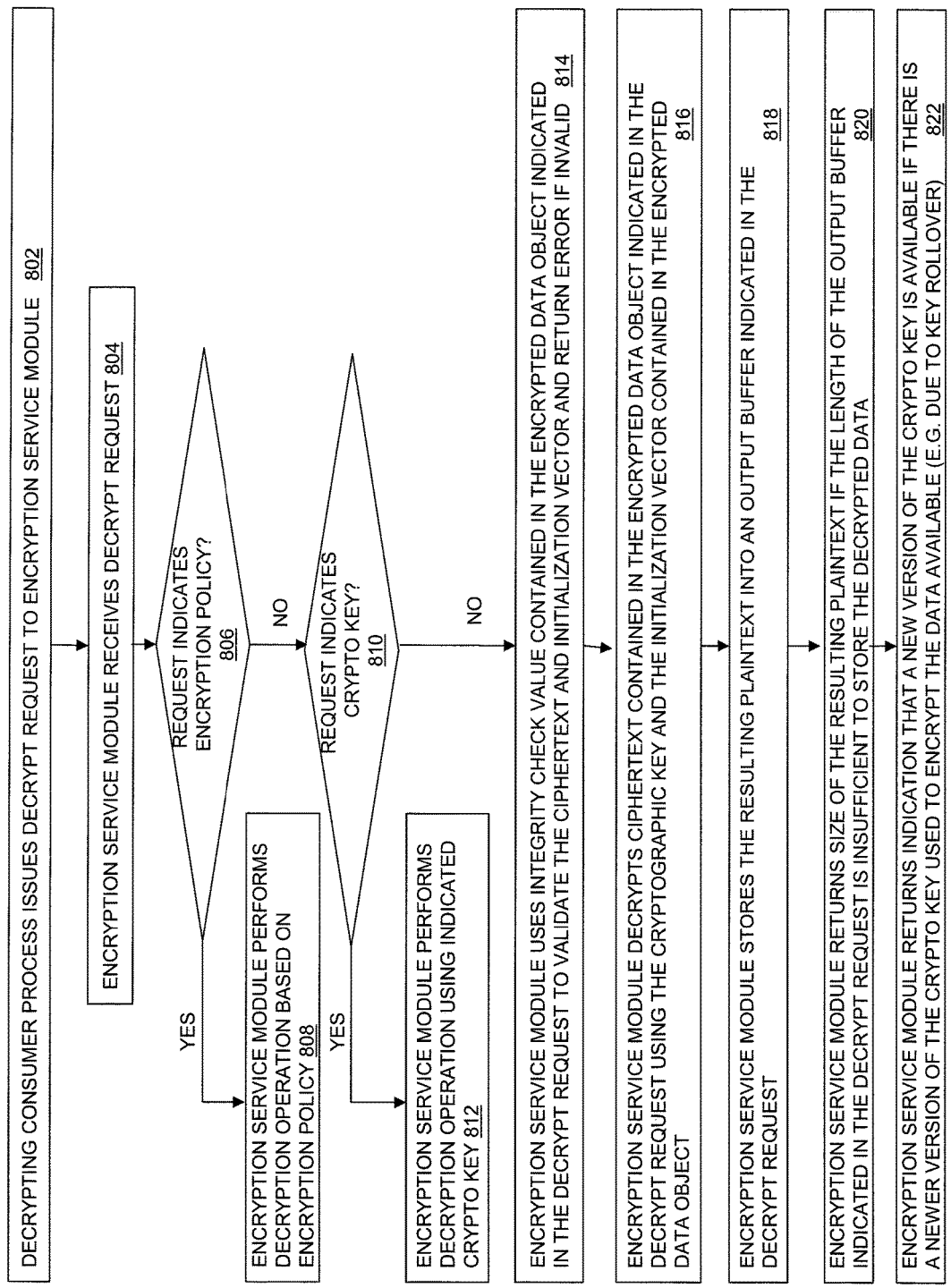
FIG. 8 is a flow chart showing an example of steps performed in some embodiments to process a decryption operation request received by an encryption service module from a decrypting consumer process.

FIG. 8 is a flow chart showing an example of steps performed with regard to processing of a decryption operation request received by an encryption service module from a decrypting consumer process. At step 802 the decrypting consumer process issues a decryption operation request to the encryption service module. The encryption service module receives the decryption operation request at step 804. At step 806, the encryption service module determines whether the set of parameters in the decryption operation request includes an indication (e.g. a text name) of an encryption policy that is to be applied to the decryption operation. If so, step 806 is followed by step 808. Otherwise, step 806 is followed by step 810.

In step 808, the requested decryption operation is performed using a cryptographic key associated with the encryption policy indicated in the set of parameters in the decryption operation request. For example, at step 808, the requested decryption operation may be performed using a cryptographic key mapped to the encryption policy by an entry in a policy mapping table. For example, at step 808, the decryption operation may be performed on ciphertext stored in a ciphertext buffer indicated in the set of parameters in the decryption operation request using the cryptographic key associated with the encryption policy indicated in the set of parameters in the decryption operation request.

At step 810, the encryption service module determines whether the set of parameters in the decryption operation request includes an indication (e.g. a text name) of a cryptographic key that is to be used in the decryption operation. If so, step 810 is followed by step 812. Otherwise, step 810 is followed by step 814.

In step 812, the requested decryption operation is performed using a cryptographic key indicated in the set of parameters in the decryption operation request. For example, at step 812, the requested decryption operation may be performed using a cryptographic key retrieved from the key store of the data encrypting system using a key name contained in the set of parameters in the decryption operation request. For example, at step 612, the decryption operation may be performed on ciphertext stored in a ciphertext buffer indicated in the set of parameters in the decryption operation request using the cryptographic key retrieved from the key store of the data encrypting system using the key name contained in the set of parameters in the decryption operation request.

At step 814, the encryption service module extracts an integrity check value from the encrypted data object stored in a ciphertext buffer indicated in the set of parameters in the decryption operation request. The encryption service module then uses the extracted integrity check value to validate the ciphertext and initialization vector contained in the encrypted data object. If the encryption service module determines, based on the integrity check value, that the ciphertext and initialization vector are not valid, then an encryption operation completion status is returned to the decrypting consumer process indicating that the ciphertext and initialization vector are not valid, and not attempt is made to decrypt the ciphertext in the encrypted data object. Otherwise, if the encryption service module determines that the ciphertext and initialization vector in the encrypted data object are valid, then the encryption service module continues operation at step 816.

At step 816, the encryption service module generates a set of plaintext by decrypting the ciphertext contained in the encrypted data object stored in the ciphertext buffer indicated in the set of parameters in the decryption operation request using the cryptographic key and the initialization vector contained in the encrypted data object. In the case where the length of the plaintext output buffer indicated in the set of parameters in the decryption operation request is sufficient to store the plaintext resulting from the decryption performed at step 816, at step 818 the encryption service module stores the plaintext into the plaintext output buffer indicated in the set of parameters in the decryption operation request.

At step 820, the encryption service module operates in response to a determination that the length of the plaintext output buffer indicated in the set of parameters in the decryption operation request is too small to store the plaintext resulting from the decryption performed at step 820, by returning, to the decrypting consumer process, a completion status indicating that the plaintext output buffer indicated in the set of parameters in the encryption operation request is too small to store the plaintext resulting from the decryption operation, and also containing the length of the resulting plaintext.

By returning a length of the plaintext resulting from performing the decryption operation at step 820 in response to determining that plaintext output buffer provided by the decrypting consumer process was too small, the encryption service module enables the decrypting consumer process to first issue a decryption operation request with a zero length plaintext output buffer, and based on the plaintext length returned by the encryption service module, issue a second encryption operation request with a ciphertext output buffer having a length that matches the plaintext length returned in response to the first encryption operation request, thus avoiding the wasteful allocation of excessively large output buffers to store plaintext resulting from decryption operations.

At step 822, the encryption service module determines whether a new version of the cryptographic key that was used to perform the decryption in step 816 is available, e.g. is stored in the key store of the data encrypting system. For example, a new version of the cryptographic key that was used to perform the decryption in step 816 may be available in the case where a key rollover or the like occurred with regard to the cryptographic key that was used to perform the decryption in step 816 at some time between the time when the encrypted data object was created and the time when the request for the decryption operation was issued. In response to determining that a new version of the cryptographic key that was used to perform the decryption in step 816 is available, at step 822 the encryption service module returns a completion status to the decrypting consumer process indicating that the version of the cryptographic key that was used to perform the decryption in step 816 is not the most recent version, and that the new version of the cryptographic key is available. In response to receiving the completion status indicating that the version of the cryptographic key that was used to perform the decryption in step 816 is not the most recent version, and that the new version of the cryptographic key is available, the decrypting consumer process may issue an encryption operation request to the encryption service module to cause the encryption service module to re-encrypt the plaintext stored in the plaintext output buffer using the new version of the cryptographic key (e.g. the new current cryptographic key resulting from the previous key rollover).

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms, including without limitation: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing encryption services in a data encrypting system, comprising:
   receiving, from an encrypting consumer process executing on processing circuitry contained in the data encrypting system, by an encryption service module executing on the processing circuitry, an encryption operation request, wherein the encryption operation request includes a set of encryption parameters, and wherein the set of encryption parameters includes a location of a plaintext buffer in a memory of the data encrypting system and a location of an ciphertext output buffer in the memory of the data encrypting system for storing ciphertext resulting from encrypting the contents of the plaintext buffer;
   determining, by the encryption service module, whether the set of encryption parameters in the encryption operation request includes an indication of a cryptographic key that is to be used by the encryption service module to transform the contents of the plaintext buffer into ciphertext;
   responsive to determining that the set of parameters in the encryption operation request does not include an indication of a cryptographic key that is to be used by the encryption service module to transform the contents of the plaintext buffer into ciphertext, the encryption service module performing an encryption operation at least in part by:
      i) retrieving a current cryptographic key stored within a key store located in the data encrypting system,
      ii) using the current cryptographic key and an associated cryptographic algorithm to encrypt the contents of the plaintext buffer by transforming the contents of the plaintext buffer into ciphertext,
      iii) creating an encrypted data object that includes the ciphertext and a key identifier that uniquely identifies the current cryptographic key and the associated cryptographic algorithm that were used to encrypt the contents of the plaintext buffer, and
      iv) storing the encrypted data object into the ciphertext output buffer;
   receiving, from a decrypting consumer process, a decryption operation request, wherein the decryption operation request includes a set of decryption parameters, wherein the set of decryption parameters includes a location of a ciphertext buffer containing the encrypted data object and a location of a plaintext output buffer for storing plaintext resulting from decrypting the ciphertext contained in the encrypted data object;
   determining whether the set of decryption parameters in the decryption operation request includes an indication of a cryptographic key that is to be used to transform the ciphertext contained in the encrypted data object into plaintext;
   responsive to determining that the set of decryption parameters in the decryption operation request does not include an indication of a cryptographic key that is to be used to transform the ciphertext contained in the encrypted data object into plaintext, performing a decryption operation at least in part by:
      i) extracting the key identifier from the encrypted data object,
      ii) using the extracted key identifier to retrieve a cryptographic key indicated by the extracted key identifier,
      iii) using the extracted key identifier to identify a cryptographic algorithm associated with the retrieved cryptographic key,
      iv) using the retrieved cryptographic key and the identified cryptographic algorithm to decrypt the ciphertext contained in the encrypted data object by transforming the ciphertext contained in the encrypted data object into plaintext, and
      v) storing the plaintext into the plaintext output buffer.

2. The method of claim 1, further comprising:
   wherein the decryption operation request is received by the encryption service module executing on the processing circuitry contained in the data encrypting system;
   wherein the location of the ciphertext buffer containing the encrypted data object and the location of the plaintext output buffer are locations within the memory of the data encrypting system;

wherein the encryption service module executing on the processing circuitry contained in the data encrypting system performs the decryption operation; and wherein the cryptographic key indicated by the extracted key identifier is retrieved from the key store located in the data encrypting system.

3. The method of claim 1, wherein the data encrypting system is a first data encrypting system contained within a cluster of data encrypting systems, wherein the cluster of data encrypting systems further includes a second data encrypting system, and the method further comprising:

synchronizing a contents of the key store located in the first data encrypting system with the contents of a key store located in the second data encrypting system, wherein the synchronizing includes copying the current cryptographic key from the key store located in the first data encrypting system to the key store located in the second data encrypting system;

transmitting the encrypted data object from the first data encrypting system to the second data encrypting system;

wherein the decryption operation request is received by an encryption service module executing on processing circuitry contained in the second data encrypting system from a decrypting consumer process executing on the processing circuitry contained in the second data encrypting system;

wherein the location of the ciphertext buffer containing the encrypted data object and the location of the plaintext output buffer are locations within a memory of the second data encrypting system;

wherein the encryption service module executing on the processing circuitry contained in the second data encrypting system performs the decryption operation; and wherein the cryptographic key indicated by the extracted key identifier is retrieved from the key store located in the second data encrypting system.

4. The method of claim 2, further comprising:
wherein performing the encryption operation further includes
generating an initialization vector,
using the initialization vector with the current cryptographic key and associated cryptographic algorithm to encrypt the contents of the plaintext buffer, and
creating the encrypted data object such that the encrypted data object further includes the initialization vector; and
wherein performing the decryption operation further includes
extracting the initialization vector from the encrypted data object, and
using the initialization vector with the retrieved cryptographic key and identified cryptographic algorithm to decrypt the ciphertext contained in the encrypted data object.

5. The method of claim 4, further comprising:
wherein performing the encryption operation further includes
generating an integrity check value by applying a cryptographic hash function to the ciphertext and the initialization vector,
creating the encrypted data object such that the encrypted data object further includes the integrity check value; and
wherein performing the decryption operation further includes, prior to decrypting the ciphertext contained in the encrypted data object, i) extracting the integrity check value from the encrypted data object, ii) using the integrity check value to check the validity of the ciphertext and initialization vector, and iii) only decrypting the ciphertext contained in the encrypted data object responsive to determining, based on the integrity check value, that the ciphertext and initialization vector are valid.

6. The method of claim 5, further comprising:
receiving, by the encryption service module after performing the encryption operation, an encryption service state change message that causes a new version of the current cryptographic key to be used to encrypt plaintext during subsequently performed encryption operations;
wherein performing the decryption operation further comprises
determining whether the retrieved cryptographic key is the most recent version of the retrieved cryptographic key, and
in response to determining that the retrieved cryptographic key is not the most recent version of the retrieved cryptographic key, issuing a completion status to the decrypting consumer process indicating that the retrieved cryptographic key is not the most recent version of the retrieved cryptographic key; and
wherein the completion status indicating that the retrieved cryptographic key is not the most recent version of the retrieved cryptographic key causes the decrypting consumer process to issue an encryption operation request to the encryption service module, whereby the encryption service module encrypts the plaintext stored in the plaintext output buffer using the new version of the current cryptographic key.

7. The method of claim 1, further comprising:
receiving, by the encryption service from the encrypting consumer process, a second encryption operation request, wherein the second encryption operation request includes a set of encryption parameters, and wherein the set of encryption parameters includes a location of a second plaintext buffer in a memory of the data encrypting system, a location of a second ciphertext output buffer in the memory of the data encrypting system for storing ciphertext resulting from encrypting the contents of the second plaintext buffer, and a length of the second ciphertext output buffer in the memory of the data encrypting system for storing ciphertext resulting from encrypting the contents of the second plaintext buffer; and
responsive to determining that the set of parameters in the second encryption operation request does not include an indication of a cryptographic key that is to be used by the encryption service module to transform the contents of the second plaintext buffer into ciphertext, the encryption service module performing a second encryption operation at least in part by:
i) retrieving the current cryptographic key stored within the key store located in the data encrypting system,
ii) using the current cryptographic key and an associated cryptographic algorithm to encrypt the contents of the second plaintext buffer by transforming the contents of the second plaintext buffer into ciphertext,
iii) comparing a length of the ciphertext to the length of the second ciphertext output buffer in the memory of the data encrypting system for storing ciphertext, and iv) responsive to the length of the ciphertext exceeding the length of the second ciphertext output buffer in the memory of the data encrypting system for storing ciphertext, issuing a completion status to the encrypting consumer process indicating that the length of the second ciphertext output buffer in the memory of the data encrypting system for storing ciphertext is too small, and wherein the completion status also indicates the length of the ciphertext.

8. The method of claim 1, further comprising:

receiving, by the encryption service from the decrypting consumer process, a second decryption operation request, wherein the second decryption operation request includes a set of decryption parameters, and wherein the set of decryption parameters includes a location of a second ciphertext buffer containing a second encrypted data object, a location of a second plaintext output buffer for storing plaintext resulting from decrypting ciphertext contained in the second encrypted data object, and a length of the second plaintext output buffer; and responsive to determining that the set of decryption parameters in the second decryption operation request does not include an indication of a cryptographic key that is to be used to transform the ciphertext contained in the second encrypted data object into plaintext, performing a second decryption operation by the encryption service at least in part by:

i) extracting a key identifier from the second encrypted data object, ii) using the key identifier extracted from the second encrypted data object to retrieve a cryptographic key indicated by the key identifier extracted from the second encrypted data object, iii) using the key identifier extracted from the second encrypted data object to identify a cryptographic algorithm associated with the cryptographic key retrieved using the key identifier extracted from the second encrypted data object, iv) using the cryptographic key retrieved using the key identifier extracted from the second encrypted data object and the cryptographic algorithm identified using the key identifier extracted from the second encrypted data object to decrypt the ciphertext contained in the second encrypted data object by transforming the ciphertext contained in the second encrypted data object into plaintext, v) comparing a length of the plaintext to the length of the second plaintext output buffer, and vi) responsive to the length of the plaintext exceeding the length of the second plaintext output buffer, issuing a completion status to the decrypting consumer process indicating that the length of the second plaintext output buffer is too small, and wherein the completion status also indicates the length of the plaintext.

9. An electronic system for encrypting data, comprising:

a data encrypting system that includes processing circuitry and a memory;

wherein the memory has program code for providing encryption services stored thereon, wherein the program code, when executed by the processing circuitry, causes the processing circuitry to:

receive, from an encrypting consumer process executing on the processing circuitry, an encryption operation request, wherein the encryption operation request includes a set of encryption parameters, and wherein the set of encryption parameters includes a location in the memory of a plaintext buffer and a location in the memory of an ciphertext output buffer for storing ciphertext resulting from encrypting the contents of the plaintext buffer;

determine whether the set of encryption parameters in the encryption operation request includes an indication of a cryptographic key that is to be used to transform the contents of the plaintext buffer into ciphertext;

responsive to a determination that the set of parameters in the encryption operation request does not include an indication of a cryptographic key that is to be used to transform the contents of the plaintext buffer into ciphertext, perform an encryption operation at least in part by causing the processing circuitry to:

i) retrieve a current cryptographic key stored within a key store located in the data encrypting system, ii) use the current cryptographic key and an associated cryptographic algorithm to encrypt the contents of the plaintext buffer by transforming the contents of the plaintext buffer into ciphertext, iii) create an encrypted data object that includes the ciphertext and a key identifier that uniquely identifies the current cryptographic key and the associated cryptographic algorithm that were used to encrypt the contents of the plaintext buffer, and iv) store the encrypted data object into the ciphertext output buffer;

receive from a decrypting consumer process executing on the processing circuitry, a decryption operation request, wherein the decryption operation request includes a set of decryption parameters, wherein the set of decryption parameters includes a location in the memory of a ciphertext buffer containing the encrypted data object and a location in the memory of a plaintext output buffer for storing plaintext resulting from decrypting the ciphertext contained in the encrypted data object;

determine whether the set of decryption parameters in the decryption operation request includes an indication of a cryptographic key that is to be used to transform the ciphertext contained in the encrypted data object into plaintext;

responsive to a determination that the set of decryption parameters in the decryption operation request does not include an indication of a cryptographic key that is to be used to transform the ciphertext contained in the encrypted data object into plaintext, perform a decryption operation at least in part by causing the processing circuitry to:

i) extract the key identifier from the encrypted data object, ii) use the extracted key identifier to retrieve a cryptographic key indicated by the extracted key identifier, iii) use the extracted key identifier to identify a cryptographic algorithm associated with the retrieved cryptographic key, iv) use the retrieved cryptographic key and the identified cryptographic algorithm to decrypt the ciphertext contained in the encrypted data object by transforming the ciphertext contained in the encrypted data object into plaintext, and v) store the plaintext into the plaintext output buffer.

10. The electronic system for encrypting data of claim 9, further comprising:

wherein the program code, when executed by the processing circuitry, when causing the processing circuitry to perform the encryption operation, further causes the processing circuitry to:
  generate an initialization vector,
  use the initialization vector with the current cryptographic key and associated cryptographic algorithm to encrypt the contents of the plaintext buffer, and
  create the encrypted data object such that the encrypted data object further includes the initialization vector; and
wherein the program code, when executed by the processing circuitry, when causing the processing circuitry to perform the decryption operation, further causes the processing circuitry to:
  extract the initialization vector from the encrypted data object, and
  use the initialization vector with the retrieved cryptographic key and identified cryptographic algorithm to decrypt the ciphertext contained in the encrypted data object.

11. The electronic system for encrypting data of claim of claim 10, further comprising:
wherein the program code, when executed by the processing circuitry, when causing the processing circuitry to perform the encryption operation, further causes the processing circuitry to:
  generate an integrity check value by applying a cryptographic hash function to the ciphertext and the initialization vector, and
  create the encrypted data object such that the encrypted data object further includes the integrity check value; and
wherein the program code, when executed by the processing circuitry, when causing the processing circuitry to perform the decryption operation, further causes the processing circuitry to:
  prior to decrypting the ciphertext contained in the encrypted data object, i) extract the integrity check value from the encrypted data object, ii) use the integrity check value to check the validity of the ciphertext and initialization vector, and iii) only decrypt the ciphertext contained in the encrypted data object responsive to determining, based on the integrity check value, that the ciphertext and initialization vector are valid.

12. The electronic system for encrypting data of claim 11, further comprising:
wherein the program code, when executed by the processing circuitry, further causes the processing circuitry to receive, after performing the encryption operation, an encryption service state change message that causes a new version of the current cryptographic key to be used to encrypt plaintext during subsequently performed encryption operations; and
wherein the program code, when executed by the processing circuitry, when causing the processing circuitry to perform the decryption operation, further causes the processing circuitry to:
  determine whether the retrieved cryptographic key is the most recent version of the retrieved cryptographic key, and
  in response to a determination that the retrieved cryptographic key is not the most recent version of the retrieved cryptographic key, issue a completion status to the decrypting consumer process indicating that the retrieved cryptographic key is not the most recent version of the retrieved cryptographic key; and
wherein the program code, when executed by the processing circuitry, further causes the processing circuitry to, in response to the completion status indicating that the retrieved cryptographic key is not the most recent version of the retrieved cryptographic key, issue an encryption operation request from the decrypting consumer process, whereby the plaintext stored in the plaintext output buffer is encrypted using the new version of the current cryptographic key.

13. The electronic system for encrypting data of claim 9, wherein the program code, when executed by the processing circuitry, further causes the processing circuitry to:
  receive, from the encrypting consumer process, a second encryption operation request, wherein the second encryption operation request includes a set of encryption parameters, and wherein the set of encryption parameters includes a location of a second plaintext buffer in a memory of the data encrypting system, a location of a second ciphertext output buffer in the memory of the data encrypting system for storing ciphertext resulting from encrypting the contents of the second plaintext buffer, and a length of the second ciphertext output buffer in the memory of the data encrypting system for storing ciphertext resulting from encrypting the contents of the second plaintext buffer; and
  responsive to a determination that the set of parameters in the second encryption operation request does not include an indication of a cryptographic key that is to be used to transform the contents of the second plaintext buffer into ciphertext, perform a second encryption operation at least in part by causing the processing circuitry to:
    i) retrieve the current cryptographic key stored within the key store located in the data encrypting system,
    ii) use the current cryptographic key and an associated cryptographic algorithm to encrypt the contents of the second plaintext buffer by transforming the contents of the second plaintext buffer into ciphertext,
    iii) compare a length of the ciphertext to the length of the second ciphertext output buffer in the memory of the data encrypting system for storing ciphertext, and
    iv) responsive to the length of the ciphertext exceeding the length of the second ciphertext output buffer in the memory of the data encrypting system for storing ciphertext, issue a completion status to the encrypting consumer process indicating that the length of the second ciphertext output buffer in the memory of the data encrypting system for storing ciphertext is too small, and wherein the completion status also indicates the length of the ciphertext.

14. The electronic system for encrypting data of claim 9, wherein the program code, when executed by the processing circuitry, further causes the processing circuitry to:
  receive, from the decrypting consumer process, a second decryption operation request, wherein the second decryption operation request includes a set of decryption parameters, and wherein the set of decryption parameters includes a location of a second ciphertext buffer containing a second encrypted data object, a location of a second plaintext output buffer for storing plaintext resulting from decrypting ciphertext contained in the second encrypted data object, and a length of the second plaintext output buffer; and responsive to a determination that the set of decryption parameters in the second decryption operation request does not include an indication of a cryptographic key that is to be used to transform the ciphertext contained in the second encrypted data object into plaintext, perform a second decryption operation at least in part by causing the processing circuitry to:
  i) extract a key identifier from the second encrypted data object,
  ii) use the key identifier extracted from the second encrypted data object to retrieve a cryptographic key indicated by the key identifier extracted from the second encrypted data object,
  iii) use the key identifier extracted from the second encrypted data object to identify a cryptographic algorithm associated with the cryptographic key retrieved using the key identifier extracted from the second encrypted data object,
  iv) use the cryptographic key retrieved using the key identifier extracted from the second encrypted data object and the cryptographic algorithm identified using the key identifier extracted from the second encrypted data object to decrypt the ciphertext contained in the second encrypted data object by transforming the ciphertext contained in the second encrypted data object into plaintext,
  v) compare a length of the plaintext to the length of the second plaintext output buffer, and
  vi) responsive to the length of the plaintext exceeding the length of the second plaintext output buffer, issue a completion status to the decrypting consumer process indicating that the length of the second plaintext output buffer is too small, and wherein the completion status also indicates the length of the plaintext.

15. A non-transitory computer readable medium for providing encryption services in a data encrypting system having instructions stored thereon that when executed on processing circuitry in the data encrypting system perform the steps of:
  receiving, from an encrypting consumer process executing on the processing circuitry, an encryption operation request, wherein the encryption operation request includes a set of encryption parameters, and wherein the set of encryption parameters includes a location of a plaintext buffer in a memory of the data encrypting system and a location of an ciphertext output buffer in the memory of the data encrypting system for storing ciphertext resulting from encrypting the contents of the plaintext buffer;
  determining whether the set of encryption parameters in the encryption operation request includes an indication of a cryptographic key that is to be used to transform the contents of the plaintext buffer into ciphertext;
  responsive to determining that the set of parameters in the encryption operation request does not include an indication of a cryptographic key that is to be used to transform the contents of the plaintext buffer into ciphertext, performing an encryption operation at least in part by:
    i) retrieving a current cryptographic key stored within a key store located in the data encrypting system,
    ii) using the current cryptographic key and an associated cryptographic algorithm to encrypt the contents of the plaintext buffer by transforming the contents of the plaintext buffer into ciphertext,
    iii) creating an encrypted data object that includes the ciphertext and a key identifier that uniquely identifies the current cryptographic key and the associated cryptographic algorithm that were used to encrypt the contents of the plaintext buffer, and
    iv) storing the encrypted data object into the ciphertext output buffer;
  receiving, from a decrypting consumer process executing on the processing circuitry, a decryption operation request, wherein the decryption operation request includes a set of decryption parameters, wherein the set of decryption parameters includes a location of a ciphertext buffer containing the encrypted data object and a location of a plaintext output buffer for storing plaintext resulting from decrypting the ciphertext contained in the encrypted data object;
  determining whether the set of decryption parameters in the decryption operation request includes an indication of a cryptographic key that is to be used to transform the ciphertext contained in the encrypted data object into plaintext;
  responsive to determining that the set of decryption parameters in the decryption operation request does not include an indication of a cryptographic key that is to be used to transform the ciphertext contained in the encrypted data object into plaintext, performing a decryption operation at least in part by:
    i) extracting the key identifier from the encrypted data object,
    ii) using the extracted key identifier to retrieve a cryptographic key indicated by the extracted key identifier,
    iii) using the extracted key identifier to identify a cryptographic algorithm associated with the retrieved cryptographic key,
    iv) using the retrieved cryptographic key and the identified cryptographic algorithm to decrypt the ciphertext contained in the encrypted data object by transforming the ciphertext contained in the encrypted data object into plaintext, and
    v) storing the plaintext into the plaintext output buffer.

* * * * *